June 19, 1956 C. K. LEEPER 2,750,741
FUEL REGULATOR RESPONSIVE TO COMBUSTION CHAMBER PRESSURE
Filed April 5, 1951 2 Sheets-Sheet 1

INVENTOR
CHARLES K. LEEPER
BY Leonard F. Weklind
AGENT

INVENTOR
CHARLES K. LEEPER
BY *Leonard F. Weklind*
AGENT

United States Patent Office 2,750,741
Patented June 19, 1956

2,750,741

FUEL REGULATOR RESPONSIVE TO COMBUSTION CHAMBER PRESSURE

Charles K. Leeper, Cambridge, Mass., assignor to United Aircraft Corporation, East Hartford, Conn., a corporation of Delaware Application April 5, 1951, Serial No. 219,344

13 Claims. (Cl. 60—39.28)

This invention relates to fuel regulating systems and more specifically to fuel regulators for internal combustion engines, ramjets, burners and the like.

It is an object of this invention to provide a fuel regulating system for maintaining the pressure in a combustion chamber at a maximum regardless of variations of operating conditions. In a ramjet unit, the maintenance of combustion chamber pressure at a maximum results in substantially maximum thrust production.

Another object of this invention is to provide a fuel regulator for a ramjet burner and the like which responds to a variation in burner pressure to control the fuel flow in an increasing or decreasing direction to restore the burner pressure to a maximum regardless of whether the instantaneous variation is due to a lean or rich mixture.

Another primary object of this invention is to provide a servo type fuel flow regulator which utilizes the amplitude and relative phase of burner pressure fluctuation caused by a controlled variation in fuel rate to indicate the magnitude and sign of the slope of the pressure-fuel rate curve; the phase of burner pressure fluctuation being compared to the phase of the fuel flow variation. A force proportional to this slope is then compared with a force proportional to the desired slope to obtain an operating force for controlling fuel flow in proportion to the error in slope.

The directions of the forces mentioned are commensurate with the sign of the slope, i. e., positive or negative.

These and other objects will become readily apparent from the following detailed description of the drawings in which.

Inasmuch as the maximum thrust obtainable from a ramjet engine exists when the pressure in the burner is at a maximum, relative to the ambient atmosphere, it is desirable to control the thrust output as a function of the pressure in the burner. Usual fuel metering devices for ramjet units utilize a differential of free stream impact and static pressures to actuate the fuel regulator in an attempt to measure the weight of air flowing through the ramjet and thus provide the basis for a constant fuel-air ratio mixture to the burner. Normally this mixture is stoichiometric. Difficulties have been encountered in this method of metering fuel because the free stream impact and static pressures do not indicate the true airflow under conditions of detached shock, for example, and because a stoichiometric mixture does not always develop the maximum thrust available from the ramjet. In other words, a maximum thrust is obtained from a ramjet when the maximum possible temperature rise occurs across the burner. Theoretically, this maximum temperature rise and the corresponding maximum pressure is obtained at a stoichiometric mixture. However this is only true if the burner efficiency is independent of the fuel-air ratio and it has been found that burner efficiency varies with the fuel-air ratio so that peak efficiency may occur at a fuel-air ratio richer or leaner than stoichiometric depending upon the particular burner. Also, since burner efficiency varies with other operating conditions such as burner inlet velocity, pressure and so forth, the maximum temperature rise and thrust will occur at a fuel-air ratio somewhere between that at peak burner efficiency and stoichiometric conditions.

When the fuel-air ratio of a ramjet burner is varied from a lean to a rich mixture, the thrust increases until the maximum is obtained. Any further increase in fuel-air ratio will decrease the thrust and also rough burning may ensue. This variation of thrust is paralleled by a similar variation of static pressure in the burner duct as well as a variation in burner pressure drop. Therefore, it is desirable that a regulator be available which will control the fuel flow so that the maximum static pressure or burner pressure drop is maintained in order to produce the maximum thrust possible from the ramjet unit.

One form of regulator of this type is illustrated and described in co-pending patent application Serial No. 117,542, filed September 24, 1949, by Louis S. Billman and Arthur C. Angelos, now abandoned.

Figure 1:
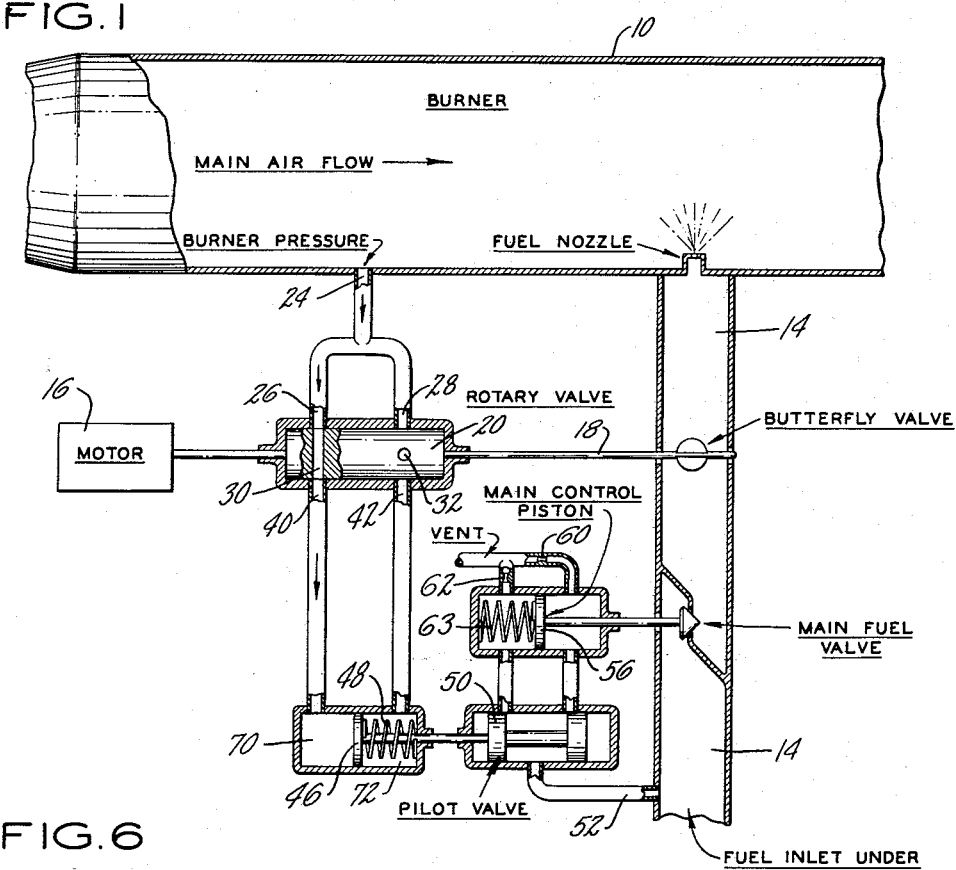
Fig. 1 is a schematic illustration of a ramjet and the fuel regulator of this invention.

Referring to Fig. 1, a ramjet unit 10 is shown having a burner section and fuel nozzle for admitting fuel under pressure into the burner. Fuel under pressure is led to the nozzle by means of a fuel line 14 in which is located a main fuel valve and a butterfly valve as illustrated. The butterfly valve is rotated at a predetermined speed by an electric motor 16 or any appropriate constant speed prime mover. A drive shaft 18 connects the motor 16 with the butterfly valve and in addition has fixed thereto a pick-off valve 20 which is rotated at the same speed as is the butterfly valve. It is not necessary that the butterfly valve be used since obviously other means may be provided for systematically varying the fuel flow. Also, the valve may be located in an auxiliary line rather than the main fuel line.

A static pressure line 24 is connected to the burner section of the ramjet and divides into two separate passages 26 and 28 which lead to the valve 20. The line 24 can be a tuned tube or tuned chamber for eliminating noise or other transient pressures. The valve 20 contains two diametric passages 30 and 32 aligned at 90° to each other. Since the valve 20 is rotating, the passages 30 and 32 will provide alternate communication between passage 26 and line 40 and then successively between passage 28 and line 42. The passages 40 and 42 each communicate with opposite sides of a piston 46 which is biased in one direction by a light spring 48.

The piston 46 in turn operates a pilot valve 50 which receives fuel under pressure via a line 52 and directs the fuel to either side of a servo piston 56 which in turn operates the main fuel valve in the fuel line 14. Restrictions 60 and 62 are provided in the vent lines leading from either side of the servo piston 56 to eliminate locking of the piston 56 and also to permit the piston 56 to assume a neutral position when the pilot valve 50 is not directing fuel under pressure to either side of the piston 56. The piston 56 is positioned in response to the fuel flow rate. The pilot valve allows more or less fuel to flow to one side of the piston than to the other. The fuel rate requires the pressure in the chamber on either side of piston 56 to rise until the fuel can exit through orifice 60 or 62 at the rate that the pilot valve 50 admits the fuel. In equilibrium the flow through the pilot valve matches that through the orifices 60, 62 and the net unbalance in pressure is absorbed by the spring. The spring 63 acts both in tension and compression depending upon the fuel rate.

Figure 2:
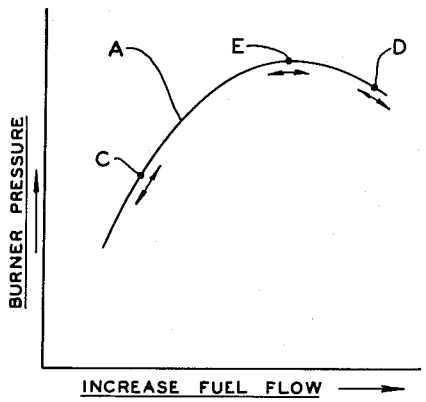
Fig. 2 is a typical burner pressure curve for a ramjet unit indicating pressure variation over a range of fuel flow.

In order to readily understand the principle involved in the regulator mechanism just described, reference is now made to Fig. 2 which illustrates a typical curve of the pressure within a ramjet burner as compared to fuel flow variation. It will be obvious that maximum burner efficiency and maximum ramjet thrust will be obtained when the burner pressure is near a maximum value. When maximum burner pressure exists, stoichiometric or near stoichiometric conditions are existent depending upon the type of burner construction. Also, it will be noted that wherever the slope of the curve A is positive, as for example to the left of point E, pressure will increase with increasing fuel rate. Conversely, wherever the slope is negative, for example to the right of point E, pressure will decrease with an increase in fuel rate since along the negative slope of the curve A an excessively rich mixture is present. For a given change in fuel rate it is further evident that the resultant change in pressure is proportional to the slope of the curve A.

Figure 3:
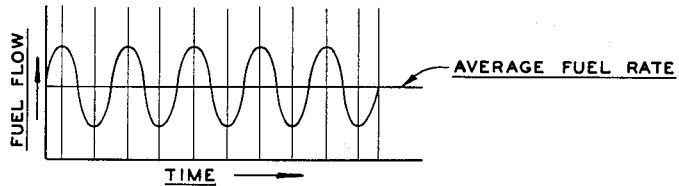
Fig. 3 is a typical sine curve for the fuel flow variation produced by the regulator.
Figure 4:
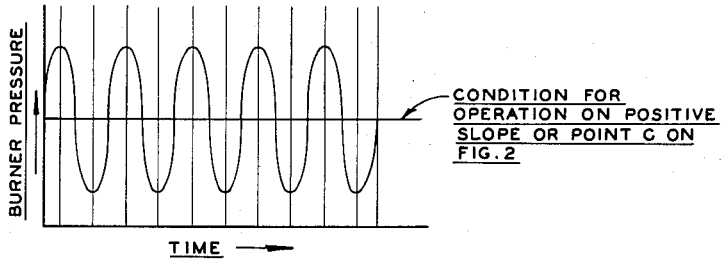
Figs. 4 and 5 are typical curves showing burner pressure fluctuations for various conditions of operation, and, Fig. 6 is a block diagram of this invention.
Figure 5:
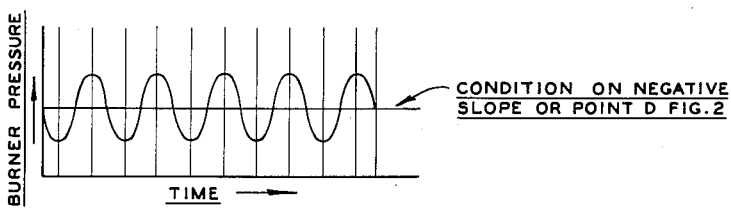

Then for a sinusoidal fuel rate variation as is produced by the butterfly valve (Fig. 1), a fuel flow will be obtained as illustrated by the curve in Fig. 3. It should be kept in mind, however, that the sinusoidal variation of fuel flow, as illustrated by Fig. 3, is of relatively small amplitude and of relatively high frequency but continuously above a zero fuel flow value. With the burner instantaneously operating at point C of Fig. 2, the corresponding burner pressure curve will be that shown in Fig. 4. Further, under this condition maximum pressure corresponds to maximum fuel pressure so that when operating on the positive slope of curve A (Fig. 2), burner pressure fluctuation and fuel flow fluctuation are in phase. On the other hand, with the burner instantaneously operating at point D on curve A, burner pressure will vary in accordance with the curve illustrated in Fig. 5. Herein it will be noted that maximum pressure occurs at minimum fuel flow and vice versa. Hence when operating on the the negative slope of curve A (Fig. 2) the burner pressure will be 180° out of phase with fuel flow fluctuation. This can be seen by comparing Figs. 3 and 5.

Referring now to Figs. 1 to 5, the principles stated above as applied to the regulator structure may be described as follows. When the butterfly valve is revolved at a given speed by the motor 16 the fuel rate to the burner is caused to oscillate in a manner shown in Fig. 3. The resulting burner pressure is led to the inlet 24 and passages 26, 28 to the rotary valve 20 which alternately directs this pressure to chambers 70 and 72 on either side of the piston 46. The valve 20 driven by the same drive (motor 16) that drives the butterfly valve and by means of the location of passages 30 and 32 the valve 20 is so oriented that when the fuel rate is at a maximum the valve 20 is porting to chamber 70 while when the fuel rate is at a minimum valve 20 permits communication to chamber 72. The valve 20 is termed a pick-off valve since it operates instantaneously to measure the high or low pressures of each fluctuation.

Thus when the slope of the pressure fuel rate curve A (Fig. 2) is positive, the pressure in the chamber 70 will be higher than that in chamber 72 and vice versa for the negative slope of curve A. This fact is evident of course since as mentioned previously, during fuel oscillation, maximum burner pressure occurs at maximum fuel rate when operating on the positive slope of the curve A and at minimum fuel rate when burner operation is on the negative slope of curve A. The forces produced on piston 46 will then result in an algebraic difference in pressure (plus or minus) at the extremes of pressure.

It should further be noted (and this is borne out by Figs. 3 to 5) that the amplitude of burner fluctuation is proportional to the slope of the pressure fuel curve A.

The resultant force on piston 46 is algebraically subtracted from a substantially constant force applied by the spring 48 so that the difference in force causes the pilot valve 50 to move in such a direction that the main fuel valve servo piston 56 will move the main fuel valve to correct the fuel rate. When the resulting force on piston 46 becomes equivalent to the force supplied by the spring 48 the pilot valve 50 will remain stationary and neutral so that no variation in fuel flow exists. As a result, if the slope of the curve A (Fig. 2) is too great in a positive sense, the pilot valve 50 and the servo piston 56 will move the main fuel valve to increase the fuel flow while if the slope is smaller than the desired slope or even negative, the pilot valve 50 and the servo piston 56 will move to decrease fuel flow.

It should be noted that a typical oscillation of fuel flow is in the order of 25 cycles per second so that any half cycle will occure in one-fiftieth of a second. Hence the time element during which any of the ports 30, 32 are in communication with their cooperating lines is of short duration. Hence if a lower average pressure in the burner occurs at any instant the peak pressure will drop in chamber 70 but also at such instant the minimum pressure in chamber 72 will also drop immediately thereafter. In fact the differential in peak and minimum pressure for any one cycle of fuel variation will become greater as one moves down the pressure-fuel rate curve so that a larger force tending to return the conditions of operation to maximum burner pressure is provided.

Since it is apparent that the spring 48 in Fig. 1 cannot represent an exact constant force, the integrating nature of the device is effective primarily where a zero slope is desired. Hence, for most purposes in the interest of simplicity, adequate control may be provided by maintaining the burner pressure adjacent the peak of the pressure-fuel rate curve where its slope is substantially zero. However, under certain conditions it may be desirable to maintain burner pressure at some other point on the curve. Therefore, the spring 48 may be replaced by a force from some other source as might be the case in electronic control.

Figure 6:
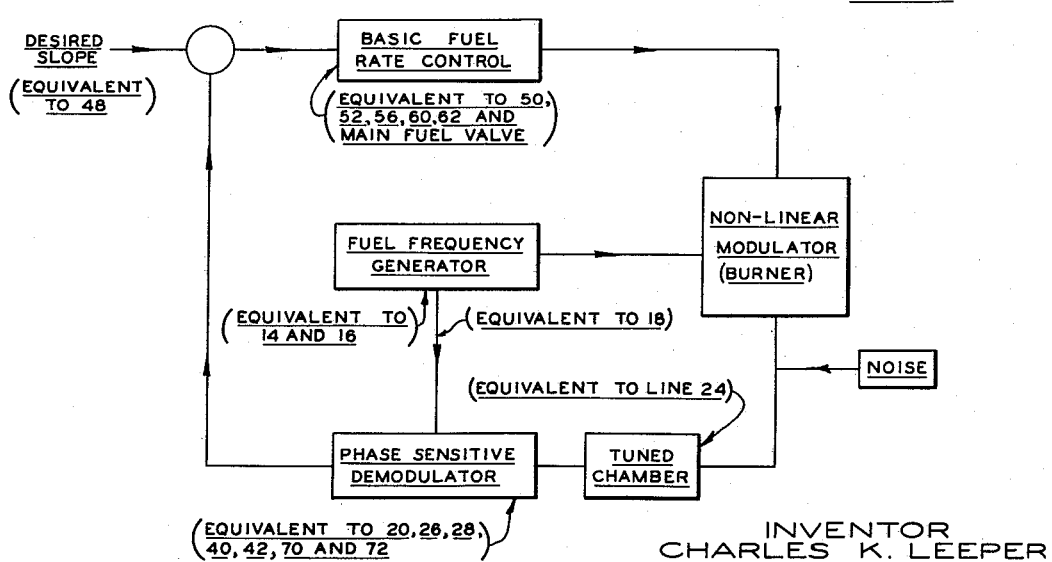

To this end the block diagram of Fig. 6 represents a broad concept of this invention with the equivalent elements of the Fig. 1 structure being indicated. In essence then, the fuel control is a servo mechanism which endeavors to maintain a desired slope of the burner pressure versus fuel-rate curve. The error in the slope is then used to control the fuel rate; an integration being carried out in the controller. This fuel rate sets the pressure level in the burner. At the same time an alternating fuel flow of small magnitude is fed to the burner wherein a fluctuating pressure is produced having the frequency of the alternating fuel flow and an amplitude proportional to the slope of the pressure versus fuel rate curve. A phase sensitive demodulator is used to produce a pressure difference proportional to the amplitude of the fluctuating pressure with the pressure differential having a sign commensuate with the slope of the pressure-fuel rate curve. This differential pressure is compared with the desired value to obtain the error signal needed by the controller.

It can be mathematically shown that if the fuel rate is cycled continuously between certain values which depart from any given point on the curve, the difference in pressures corresponding to the maximum and minimum fuel rate will be proportional to the slope of the pressure-fuel rate curve at the particular point. Therefore, these properties may be used to obtain a measurement of the slope of the curve in the following manner. A means is provided for cycling the fuel flow rate with a predetermined amplitude about the mean fuel rate value and other means is provided for measuring the burner pressure when this oscillating fuel rate is at a maximum and also at a minimum. By measuring the difference of these pressures the difference therebetween will represent the slope of the pressure-fuel rate curve both in sign and relative magnitude. The device for determining this difference is shown in Fig. 6 as the phase sensitive demodulator.

The unit providing the slight variations in fuel flow is shown as a fuel frequency generator which has two functions. One of these functions is to cycle the fuel rate about the main rate and the other is to provide the intelligence which indicates to the phase sensitive demodulator when the fuel rate is a maximum and also when it is a minimum.

The phase sensitive demodulator uses the information from the fuel frequency generator to guide it in its measurement. Thus when the fuel frequency generator indicates that the fuel rate is at a maximum, the phase sensitive demodulator traps air in one chamber at the then existing burner pressure and when the fuel rate is at a minimum during fluctuation the phase sensitive demodulator traps air in another chamber at the then existing burner pressure. The differential of these two pressures in the two chambers which is substantially proportional to the slope of the curve may then be compared with the desired pressure difference and the resulting error fed to the basic fuel rate controller. Thus the differential pressure mentioned above can be transposed into an electrical signal which can be compared to a signal commensurate with the desired slope of the curve to provide a controlling resultant signal to the main fuel controller.

The tuned chamber of Fig. 6, which is equivalent to the line 24 of Fig. 1, is in fact an acoustic filter and amplifier combination which could readily be replaced by electronic elements in an electronic version of this invention.

As a result of this invention it is evident that a simple and highly sensitive fuel flow regulator has been provided which can regulate fuel regardless of variations of burner operating conditions. It will be further evident that the fuel regulator described herein is readily adaptable to other burners and not necessarily limited to use in ramjet units.

Although only one embodiment of this invention has been illustrated and described herein, it is evident that various changes and modifications may be made in the construction and arrangement of the various parts as well as substituting electrical components for mechanical units without departing from the scope of this novel concept.

What it is desired to obtain by Letters Patent is:

1. In a fuel control for a combustion chamber having a gas flowing therethrough, a source of fuel under pressure, means for conducting fuel to the burner to mix with said gas, a regulator for systematically varying the rate of fuel flow to the burner in increasing and decreasing amounts above a zero value, means for sensing the pressure in said burner including a valve movable in timed relation with said fuel flow variation, and means responsive to said sensing means for varying the amount of fuel flowing from said source to said regulator.

2. In combination, a ramjet unit having a burner section through which a gas flows, means for injecting fuel into said burner to mix with said gas, a source of fuel under pressure, a conduit leading from said fuel source to said injecting means, a valve in said conduit for varying the flow of fuel sinusoidally above a zero value including means for moving said valve, means for sensing the pressure in said burner including mechanism movable in timed relation with said valve, and means responsive to said sensing means comprising a second valve in said conduit for varying the flow of fuel from said source to said first valve.

3. In a fuel control for a combustion chamber having a gas flowing therethrough, a source of fuel under pressure, means for conducting fuel to the burner to mix with said gas, a regulator for systematically varying the rate of fuel flow to the burner in increasing and decreasing amounts above a zero value whereby the pressure in the burner is fluctuated, means for sensing the pressure in said burner including a valve movable in timed relation with said fuel flow variation, a plurality of ports controlled by said valve whereby one of said ports is opened when the regulated flow is at a maximum and another of said ports is opened when the regulated flow is at minimum, and means operatively connected to said ports and responsive to the pressures conducted therethrough for controlling the flow of fuel from said source to said regulator.

4. A fuel control according to claim 3 wherein said last mentioned means is responsive to the differential of pressures from said ports.

5. A fuel control according to claim 4 wherein said last mentioned means comprises a movable control, a servomotor operated in response to movement of said control, and a valve operated by said servomotor.

6. A fuel control according to claim 5 wherein said servomotor is operated by said fuel under pressure.

7. In a fuel control for a burner having a gas flowing therethrough, a source of fuel under pressure, regulator means for systematically fluctuating the rate of fuel flow from said source to the burner whereby the pressure in said burner is fluctuated, means responsive to the amplitude and phase of said pressure fluctuation relative to said fuel flow variation for producing a force proportional to the magnitude and sign of the slope of the pressure-fuel rate curve of the burner at the point where the burner is momentarily operating including operative connections to said regulator means, the direction of said force being consistent with the sign of said slope, means for producing a force proportional to the desired slope of the curve, comparator means for comparing said produced forces and creating a resultant force, and a servo mechanism responsive to the resultant force for further varying the flow of fuel to said regulator means.

8. A fuel control according to claim 7 wherein a pilot valve is movable in response to said resultant force and includes operative connections to said servo mechanism.

9. In a fuel control for a burner having a gas flowing therethrough, a source of fuel under pressure, a conduit leading from said source to the burner, regulator means for systematically varying the rate of fuel flow to the burner above a zero value, said fuel mixing and burning with the gas whereby the pressure in said burner is fluctuated, control means operative in timed relation with said fuel variation including pressure sensing connections to said burner, means responsive to said control means for detecting the amplitude and phase relationships of said fuel variations and said pressure fluctuations, said phase relationship varying between positive and negative values, means for producing a signal proportional to said relationships, a second fuel regulating means cooperating with said regulator means, and means responsive to said signal for controlling said second regulating means.

10. In a fuel control for a burner having a gas flowing therethrough, a source of fuel under pressure, a conduit leading from said source to the burner, regulator means for systematically varying the rate of fuel flow to the burner above a zero value, said fuel mixing and burning with the gas whereby the pressure in said burner is fluctuated, control means operative in timed relation with said fuel variation including pressure sensing connections to said burner, means responsive to said control means for detecting the amplitude and phase relationships of said fuel variations and said pressure fluctuations, said phase relationship varying between positive and negative values, means for producing a signal proportional in strength to said amplitude relationship and in a positive and negative direction commensurate with said phase relationship, a second fuel regulating means for further regulating the fuel flow in said conduit, and means responsive to said signal for controlling said second regulating means.

11. In a fuel control for a burner having a gas flowing therethrough, a source of fuel under pressure, means for directing fuel from said source to said burner to mix with said gas, a valve for varying the flow of fuel in an oscillating manner at a predetermined frequency whereby the pressure in said burner is fluctuated including means for moving said valve, a pick-off valve movable in timed relation with said first mentioned valve for sensing the burner pressure variation and phase of said fluctuations relative to said fuel oscillations including a plurality of ports opened and closed by the motion of said pick-off valve, a piston-cylinder arrangement having variable chambers each connected to at least one of said ports, a pilot valve responsive to movements of said piston, a servo-motor controlled by said pilot valve, and a main fuel control means responsive to movements of said servo-motor for further varying the flow of fuel to the burner.

12. In a fuel control for a combustion chamber having a gas flowing therethrough, a source of fuel under pressure, means for conducting fuel to the burner at a mean rate to mix with said gas, means for varying the mean rate of fuel flow to the burner at a predetermined frequency and a predetermined amount, means for sensing the burner pressure variations resulting from said fuel flow variation, means operatively connected to said fuel varying means and said sensing means for determining the algebraic difference of said pressure and fuel variations, said last means producing a resultant signal commensurate with said algebraic difference, means for producing a signal commensurate with a desired mean rate fuel flow, and comparator means for receiving said signals and producing a final signal to control said conducting means.

13. In a fuel control for a combustion chamber having a gas flowing therethrough, a source of fuel under pressure, means for conducting fuel to the burner at a mean rate to mix with said gas, a first means for varying the mean rate of fuel flow, second means for varying the rate of fuel flow to the burner at a predetermined frequency and a predetermined amount above and below said mean rate, means for sensing the burner pressure variations resulting from said predetermined fuel flow variation, means operatively connected to said second fuel varying means and said sensing means for determining the amplitude and phase relationship of said fuel and pressure variations, and means operatively connecting said last mentioned means to said first fuel varying means to vary said mean rate of fuel.

No references cited